United States Patent [19]

Rogers et al.

[11] 3,845,718
[45] Nov. 5, 1974

[54] TRANSPORTER SYSTEMS
[75] Inventors: Peter C. Rogers, Hemel Hempstead; Frank B. Harrison, Berkhamsted; Richard C. Hipkiss, Sussex; Joseph Sunasky, Caddington; Nigel G. Shapcott, Studham, all of England
[73] Assignee: Dexion-Comino International Limited, Middlesex, England
[22] Filed: Feb. 16, 1973
[21] Appl. No.: 333,102

[52] U.S. Cl. .................... 104/130, 105/177, 104/96
[51] Int. Cl. ............................................. E01b 25/06
[58] Field of Search ............ 180/79.2 C; 104/23 FS, 104/96, 105, 88, 130, 131, 242–248; 105/177

[56] References Cited
UNITED STATES PATENTS
3,596,730   8/1971   Cecce ........................... 180/79.2 C
3,643,601   2/1972   Taylor .................................. 104/88
3,672,307   6/1972   Richins ........................... 104/23 FS Primary Examiner—Robert S. Ward, Jr.
Assistant Examiner—D. W. Keen
Attorney, Agent, or Firm—Fred Philpitt

[57] ABSTRACT

The invention relates to a car, for a tracked transporter system, supported upon wheels each of which is mounted so that it can swivel about an upright axis and one or more of which are drivable by a power unit carried upon the car, the car being further provided with automatically actuated steering means responsive to passive control means in the track of the system and operative for imparting swivelling movement to the said wheels to cause the car selectively to follow predetermined routes or courses in the said system. Advantageously the car comprises its own self-contained source of power, such as an electric motor supplied by a battery carried upon the car. The said steering means may be provided in conjunction with one wheel only, the wheels being all coupled together so that they swivel in unison.

9 Claims, 4 Drawing Figures

TRANSPORTER SYSTEMS

This invention concerns improvements relating to transporter systems. It seeks to provide an effective and versatile system involving little obstruction of or interference with the floor or other surface over which the system is to operate.

A particular object of the invention is to provide a transporter system which has economic and operational advantages over a normal conveyor system, especially for the conveyance of goods over long distances where the frequency of movement of the goods is low and/or irregular. The system is also intended to require a minimum of labour for its operation and maintenance.

According to the invention, in or for such a system, a transporter car is supported upon a plurality of wheels, generally four in number, each of which is mounted so that it can swivel about an upright axis and one or more of which are drivable by a power unit carried upon the car, the car being further provided with automatically actuated steering means responsive to passive control means in the track of the system and operative for imparting swivelling movement to the said wheels to cause the car selectively to follow predetermined routes or courses in the said system. Each car may further comprise its own self-contained source of power, for example, an electric motor supplied by a battery carried on the car, as well as other means for the control of the operation of the car. Each car of the system car can thus be a wholly independent unit.

By the term passive control means in the track in this Specification and the appended claims, it is to be understood that steering control is not exercised by shiftable points on other movable car-switching track or rail sections acting upon the wheels to change their course. Movable steering-means is confined to the car, so that the track itself may be completely passive. The design, layout and maintenance of such a track are relatively simple and inexpensive. Moreover, with a self-contained source of power on the car, the track will not be utilized to supply power, so that it can be a "dead" track in all respects.

In its straight or continuous portions, the track may be of a simple nature, suitably in the form of flat plate with an upstanding flange affording guidance to plain wheels on the cars.

The said steering means may comprise plungers carried under the car on a swivelling wheel mounting and projectable downwardly for engagement with stop means positioned on the track for imparting swivelling movement to the said mounting and wheel. Preferably, such steering means is provided in conjunction with one wheel only and the wheels, or some of them, are coupled together, for example, by chain gear, so that they swivel in unison. Primary guidance or steering force need then be applied to the one wheel only.

Advantageously only one wheel is driven, the driving means being carried upon the wheel mounting so that it will swivel with the wheel without interference with the continuity of drive.

Also in accordance with the invention, a transporter system may comprise, in combination with such a car, a track in which passive control means is provided for initiating operation of the said steering means on the car.

One manner of carrying the invention into effect will now be more fully described, by way of example, with reference to the accompanying drawings, in which.

Figure 3:
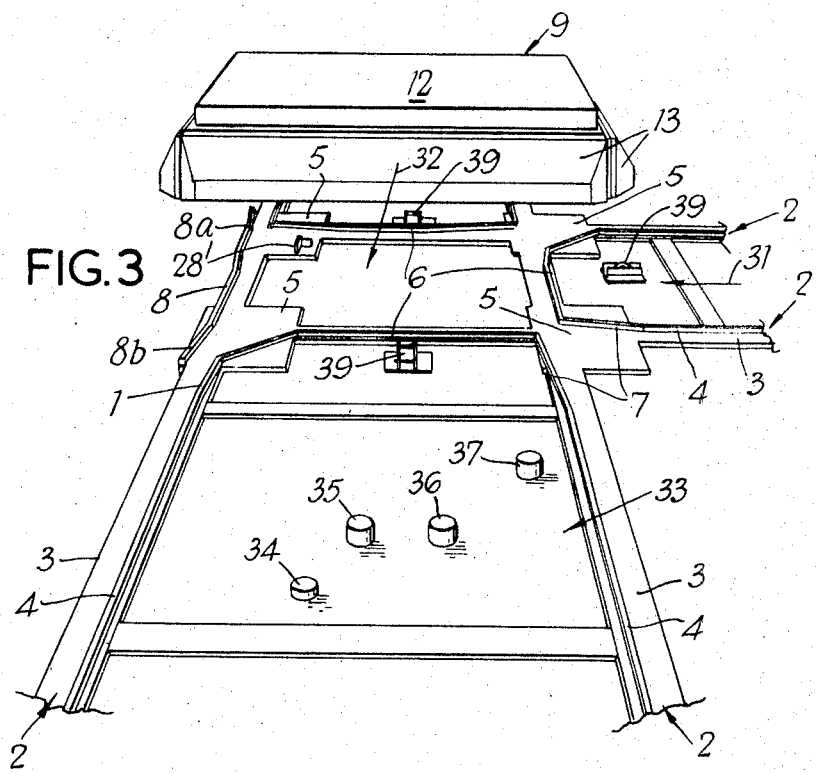
FIG. 3 is a perspective view of a car approaching a three-way junction followed by a car-programming section.
Figure 4:
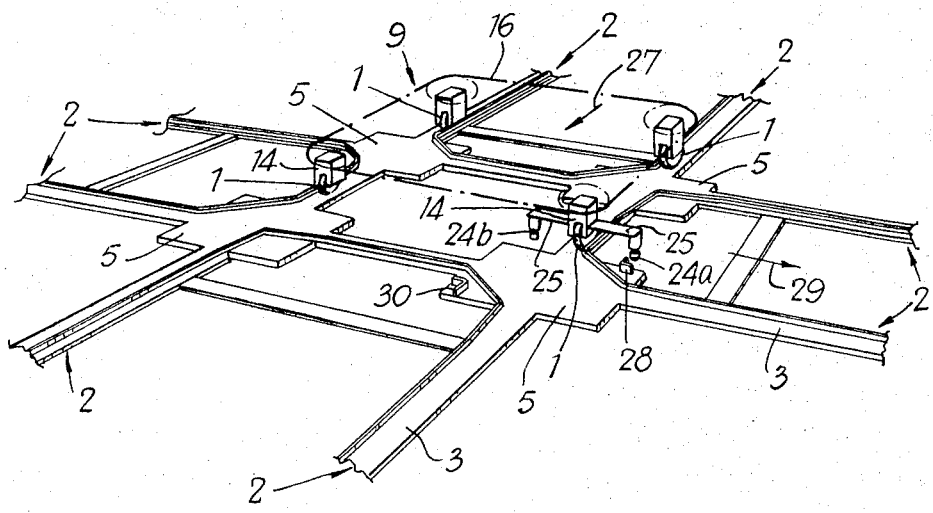
FIG. 4 is a diagrammatic view similar to FIG. 1, but indicating only the wheels and associated parts of the car.

In the transporter system illustrated, the cars or trolleys each run by four slightly crowned, but unflanged, steel wheels 1 on pairs or rails 2 which consist of flat steel plates 3 resting on the floor by way of rubber strips, secured to the floor by spiked or anchor bolts and having upstanding flanges 4 outside which respective wheels 1 travel (FIG. 4). At junctions, the plates 3 adjoin or merge with substantially square steel platforms 5 having upstanding flanges 6 connecting the flanges 4 of pairs of rails. The disposition of these connecting flanges will be such as to afford full freedom to the wheels 1 to perform their steering movements as hereinafter described and, where necessary, to guide the wheels gently back into their normal relationship to the flanges 4 beyond a junction. Slightly inclined flange sections for this purpose are indicated at 7. For similar purposes, if required, a flange 8 may be located outside the path of the wheels 1, as shown in FIG. 3, and provided with lead-in and lead-out portions 8a, 8b.

Figure 2:
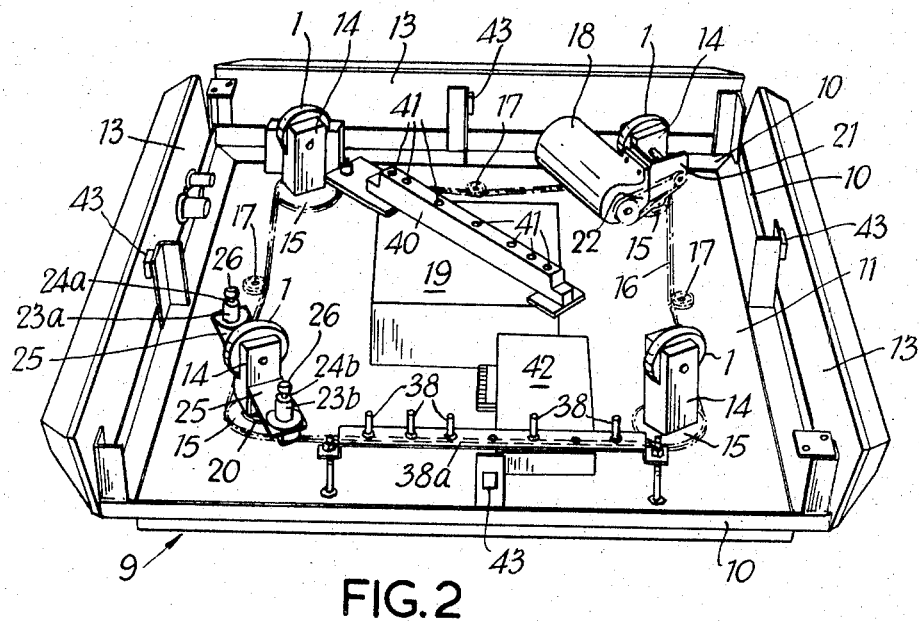
FIG. 2 is a perspective view of the underneath of the car, one section of skirt having been removed.

Each car 9 comprises a welded angle-steel frame 10 (FIG. 2) supporting an under plate 11 and an upper, load-carrying, plate 12. Protective skirt sections 13 are hingedly connected at their upper edges to the four sides of the frame 10 in readily detachable manner. Each wheel 1 is rotatably mounted in a forked pillar 14 which is itself mounted on the plate 11 so that it can swivel about a vertical axis. One pillar 14 may be spring-loaded downwardly to ensure four-wheel contact with the track at all times. Fast with each of the mountings 14 is a sprocket wheel 15, the four sprocket wheels being coupled, by an endless horizontal chain 16 extending around them, so that the wheels 1 will always turn together about the vertical axes, in the same sense and to the same extent. The four flights of the chain 16 are loaded by tensioning wheels 17, which may be screw-adjusted or spring-loaded. With such coupling, primary guidance need be applied at one wheel 1 only. Furthermore only one wheel 1 need be driven. Conveniently, guidance and drive are provided at two diagonally opposite wheels, for example, guidance at the right-hand leading wheel 1, as seen from the front, and drive at the left-hand trailing wheel 1 (FIG. 2).

The driven wheel 1 is driven by a small direct-current electric motor 18 supplied by two 12-volt secondary batteries of 50 ampere-hour total capacity carried, in a case 19, on the car. The supply is by way of slip rings which are not seen in FIG. 2, but are located similarly to slip rings 20 hereinafter referred to. The motor 18 is supported by a bracket 21 from the pillar 14, so that it will swivel with the wheel 1 without interference with the continuity of drive to the latter. The drive is transmitted to the wheel 1 through reduction gearing, housed with the motor, and chain and sprocket gear 22.

The drive may be transmitted by way of a torque-limiting device (not seen) which affords mechanical overload protection. Alternatively electrical overload-protection means may be provided.

Figure 1:
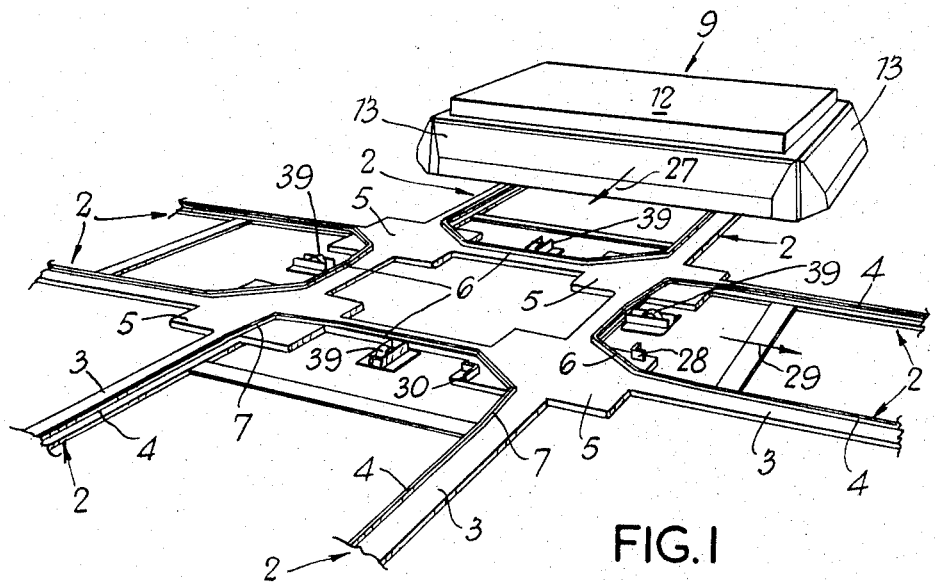
FIG. 1 is a perspective outline view of a car approaching a four-way junction or crossing.

Steering at junctions in the track is by electromechanical means. For this purpose, two vertical solenoids 23a, 23b energisable by way of the slip rings at 20 and housing plunger cores 24a, 24b are carried at the ends of arms 25 extending one to each side from the pillar 14 for the primary-guidance wheel 1 referred to above. These arms 25 normally extend at right angles to the direction of travel as shown in FIG. 4. The lower ends, furnished with rollers 26, of the plunger cores 24a, 24b are engageable with small upstanding stops provided at corners of the platforms 5. The location and nature of a stop will depend upon the function which it has to perform at the particular junction or other guidance point. A common case will be that of a junction at which a car may be required either to pass straight through or to be turned off at a right angle. For example a car 1 approaching in the direction of the arrow 27 (FIGS. 1 and 4) may be required to pass straight through or be turned off onto the track section to the right of the figure. To permit of selection between these courses, a stop 28 of open right-angle shape is provided at the first-encountered right-hand corner of the second-encountered right-hand platform 5, the opening of the stop being directed outwardly of the platform. The height of the stop 28 is such that it will not be engaged by the right-hand plunger 24a unless the latter has been brought to the lower of its two possible positions by the action of the solenoid 23a. If it is in its upper position, it will simply pass over the stop 28 and the car will continue in its original direction straight through the junction. If the plunger 24a is in its lower position, however, it will be temporarily arrested by the stop 28, so that the arms 25, the pillar 14 and wheel 1 will be turned, as the car progresses without stopping or change of speed, through 90°. Due to the coupling action of the chain 16, all of the wheels 1 will be so turned and will follow quarter-circular paths of respective platforms 5, the radius of these paths being about one half of the length of the side of the platform. The wheels 1 are thereby guided onto the rails 2 of the track section extending to the right (as seen in FIG. 4) in the direction of the arrow 29. The arms 25 are now at right angles to the new direction 29 of travel, the plunger 24a is free to emerge from the stop 28 and is automatically retracted by the solenoid. The car has negotiated a 90° turn, the wheel 1 with the plungers 24a, 24b remaining at what has become the leading side of the car. If it were required that a car could alternatively be directed at the junction to the left, as seen in FIGS. 1 and 4, then a further stop could be provided, in mirror-image relation to the stop 28, where it would be engageable by the plunger core 24b when in its lower position. Furthermore, stops may be similarly provided for controlling a car entering the junction from another direction. An example in FIGS. 1 and 4 is the stop 30 by which a car approaching the junction from the left in the direction of the arrow 29 can be guided out in the direction of the arrow 27 as an alternative to proceeding straight through in the direction of the former arrow. Various arrangements of this kind of stop can be provided to suit requirements, not only at four-way junctions but also at bends and three-way junctions. Generally a system will comprise junctions and bends involving right-angle turns only. For turns through angles greater or less than 90° stops of angular forms other than a right angle may be used. Alternatively a turntable may be used. In all cases, the turn or bend can be negotiated without the track itself having to be laid out with a bend of large radius.

At some junctions or points in a system, the path to be followed by a car may be compulsory. For example at the T-junction shown in FIG. 3, it may be compulsory for every car approaching in the direction of the arrow 31 to be turned to its left and to continue in the direction of the arrow 32. This can be achieved without the necessity for providing for a plunger, 24a or 24b, to be brought to the lower position, if the flange 28' is made so high that it will be engaged by the respective core in its upper position. In the example of FIG. 3, every car approaching in the direction 32 will pass straight through, while every car approaching in the direction 31 will be turned into the former direction.

As will be appreciated, guidance of each car is thus initiated by static devices on the track. The guidance exercised upon a particular car at junction and similar points in the system may be determined by control effected in various ways depending on the requirements of the system. Each car may be programmed remotely by switches on a console, located at a single control point to and from which cars can be summoned and despatched. However, more than one such control point can be provided. In the example illustrated, programming is effected by energisation of D.C. solenoids set in the floor of a programming section of track such as is indicated at 33 in FIG. 3. By way of a simple example, four such solenoids 34-37 are shown, one of which, 34, will produce an "erase" signal for eliminating previous instructions given to the car. For cooperating with these solenoids, reed switches 38 are suspended below a transverse bar 38a at the leading edge of the car where they can be located in selected positions corresponding to the positions in which the solenoids 34-37 are located in the particular system, the magnetic coupling between an energized solenoid and the corresponding reed switch 38 being sufficient to close that switch as the car passes over. The action of the closed reed switch may conveniently be to set a bistable circuit on the car to have a logical "1" signal at its output. A short distance before each junction, an actuator, as shown a spring-loaded roller 39, is mounted on the floor in a transverse position where it will actuate a corespondingly positioned microswitch, allocated to that junction, on the car. A series of locations for such microswitches is provided in a diagonally disposed carrier 40 suspended below the car, each switch being closable by an actuator 39 through a respective small ball 41 lodged in a recess in the bar. The diagonal disposition of the carrier 40 ensures correct coordination of the actuator and switch positions in spite of possible different orientations of the car. The microswitch closable by the actuator in advance of the particular junction is in the output of the bistable circuit connected to the reed switch 38 for that junction and is connected by way of an amplifier to the solenoid, 23a or 23b, whose energization will produce the required turn, to the right or left, at that junction. Thus a complete route can be programmed in the car by energizing a combination of solenoids 34-36, a different microswitch being energised by a differently located actuator 39 at each junction. Further solenoids set in the track floor at other locations may serve other purposes. For instance, such a solenoid may cooperate with a further reed switch 38 to initiate stopping and starting of the driving motor 18 and halting of a car at a particular point. Other functions may be similarly controlled, for example, reversing and re-orientation of the car in relation to the direction of travel. Control in this manner may, if required, be made fully automatic by arranging for the programming to be imposed by an on-line computer, a punched card or badge-reading system or the like. In any case, each car thus has a control/memory unit of its own, preferably of a solid-state character.

Instead of or in addition to such semi-automatic or fully automatic control, provision may be made for a car to be instructed by means of simple mechanical switches, such as push buttons, corresponding to required routes or functions of the car. To permit of emergency piloting of a car round the system, the car itself may be provided with a small switch panel in one of the skirts 13, by which the motor 18 can be controlled, the steering being controlled automatically in the manner previously described.

The control circuitry, which is also supplied from the batteries referred to above, is enclosed within a housing 42 (FIG. 2) carried on the car. This housing may also enclose switchgear so controlling the motor 18 as to ensure smooth acceleration and deceleration of the car.

For some purposes, accurate stopping of cars, say within an accuracy up to ±½ cm, may be necessary, for example for cooperation with automatic loading or unloading apparatus. Such stopping, initiated, for example, by stopping of the motor 18 by a solenoid as mentioned above, can be achieved by the provision at the required point of a slight ramp followed by a trough in each rail, the power supply to the motor being cut off approximately when the driven wheel reaches the crest of the ramp, while the final stopping position of the said wheel is at the bottom of the trough. The motor 18 may, if required, be of a type affording regenerative braking. However, other mechanical or electromechanical arresting means may be employed.

With a system such has been described, a car can be made automatically to transport goods or materials, whether palletised or not, livestock or personnel from one location to another along a selected one of a plurality of predetermined routes. The system is applicable, for example, to the conveyance of loads of up to 2 tons at speeds up to 3 feet per second. It may be employed with advantage for automatic goods or pallet handling in warehouses, including delivery to and from the same, for production-line assembly work and for cargo or baggage handling.

By way of example, in a warehouse installation, a track in the form of an elongated loop may include not only a goods-in loading station, a car call-up and programming point at a control station, a plurality of pick-up and delivery stations associated with sections of storage racking, and a goods-out unloading station, but also an empty-car accumulation circuit or branches following the unloading station, a loaded-car accumulation circuit or branches following the loading station, and car-maintenance branches following an accumulation circuit and/or the control station. Proximity-sensing control means may be utilised to achieve car-spacing in the accumulation sections.

A track branch or branches may also be utilised for automatic battery charging. For example, provision may be made to enable the batteries of the cars to be charged at least once in completing a closed circuit, for example, when in an accumulation section. For this purpose, a charging bus bar may be disposed in or sufficiently close to a section of the track to allow pick-up brushes on each car to make sliding contact therewith, so that the batteries of a car traversing the said section will automatically receive a charge.

To avoid risk of damage or injury due to accidental encounter of a car with an object or person, each skirt section 13, in addition to being externally padded, is associated with a microswitch 43 (FIG. 2) supported from the frame 10. Upon encounter of a skirt section with an obstruction, closure of the switch is arranged automatically to de-energize the motor 18 and arrest the car until the obstruction is removed.

Provision may further be made to preclude too-close approach or collision between cars. This may be achieved by proximity-sensing control means. Alternatively use may be made of a segmented control track, rail or bus bar, in which conductive segments are isolated by insulating inserts. In one arrangement for this purpose, each car may have a signal-transmitting probe at its trailing end and a receiving probe at its leading end, with respect to its direction of travel. The distance between these probes is slightly greater than the length of one conductive segment and one insulating insert. A signal transmitted from one car will be received by a following car only when its receiving probe is in contact with the same track segment. On receiving this signal the following car will switch itself off, only to proceed when the signal is removed by the leading car moving to the next track segment.

Similar means may be used for car accumulation, using an externally transmitted signal, at a fixed point, for stopping the leading car in any predetermined position. This car in its turn will stop the following car and so on.

Various modifications may be made in the above-described system: Other forms of track/wheel combination may be employed with, say, double-flanged rails or with single-flanged or double-flanged wheels running on plain rails. Moreover, between junction points, use may be made of guideways in which there is no mechanical guidance for the wheels, for example an inductive wire, set in the floor, whose field can be sensed and followed by the car or a line, painted on the floor, which can be sensed by photoelectric means on the car.

Solenoids 23a, 23b may be provided on more than one wheel pillar 14. Instead of the arrangement described above, use may be made of an assembly of four solenoids carried, at the corners of a square, by a wheel pillar 14 and having plungers projectable in pairs, on the left or right-hand side, to engage in substantially quarter-circular grooves in a junction platform, these grooves starting and finishing beside the extremities of the respective rails adjoining the platform. Plungers projected to engage in these grooves will cause swivelling of the wheels to right or left, as the case may be, as previously described. Plungers may be moved by small electric motors instead of by solenoids 23a, 23b. Such motors may be mounted on the pillars 14 and arranged to be energized by control means similar to those described for the solenoids. For some applications, movement of the plungers by mechanical means may be practicable.

In place of the chain 16, a V or toothed belt may be employed. Alternatively the coupling may be by way of a mechanical linkage or gearing, for instance a toothed ring meshing with pinions on the pillars 14, or through servo-motors operated in unison to run individual pillars. For some purposes, the coupling may be such that the wheels are not all turned in the same sense or through equal angles. Thus one pair of wheels (whether a front and rear pair or a right and left-hand pair) may be swivelled in one sense and the other pair in the opposite sense.

Other car-driving means, whether "inboard" or "outboard," may comprise an A.C. electric motor, including linear motor, pneumatic or hydraulic motor or internal-combustion engine. The drive may be transmitted by way of a flexible shaft or through gearing associated with a drive shaft disposed coaxially in the wheel pillar.

We claim:

1. A transporter system comprising in combination:

a. track means,
   b. a car supported upon a plurality of wheels, each wheel being mounted so that it can swivel about an upright axis,
   c. a power unit carried upon the car and drivingly connected to at least one of the said wheels, and
   d. automatic steering means including
      1. passive control means provided in said track means,
      2. devices carried upon the car and operable in response to the passive control means for imparting to the said wheels swivelling movement in relation to the car to thereby cause the car to selectively follow a predetermined course along said track means while maintaining its orientation in relation to the system.

2. A system according to claim 1, wherein the said automatic steering means comprises plungers carried under the car on a swivelling wheel mounting and projectable downwardly for engagement with stop means positioned on the track for imparting swivelling movement to the said mounting and wheel.

3. A system according to claim 1 wherein the power unit is an electric motor supplied by a battery carried upon the car and rechargeable thereon.

4. A system according to claim 1, wherein the said steering means is provided in conjunction with one said wheel only and the wheels are all coupled together so that they swivel in unison.

5. A system according to claim 1, wherein only one said wheel is driven, the wheel-driving means being carried upon the swivelling mounting of that wheel.

6. A system according to claim 1, wherein wheel-driving means includes torque-limiting means.

7. A system according to claim 1, wherein passive control means for initiating operation of the said steering means on the car comprises devices provided in the track for selectively actuating switch means on the car.

8. A system according to claim 1, wherein passive control means for initiating operation of the said steering means on the car comprises, for programming the car for the course it is to follow, selectively energizable electromagnetic means provided in the track means for actuating switches which are provided on the car and which predetermine operation of the said steering means at selected points in the track means.

9. A system according to claim 1, wherein passive control means for initiating operation of the said steering means on the car includes stop means for engagement by a downwardly projectable plunger on the car, comprising flanges at right angles to each other and so disposed on the track means as to receive and be engaged by the plunger when projected and to permit disengagement of the latter after steering movement thereby initiated has been completed.

* * * * *